June 9, 1925.
R. B. OWEN
STORAGE BATTERY
Filed Dec. 22, 1919   2 Sheets-Sheet 1
1,541,377
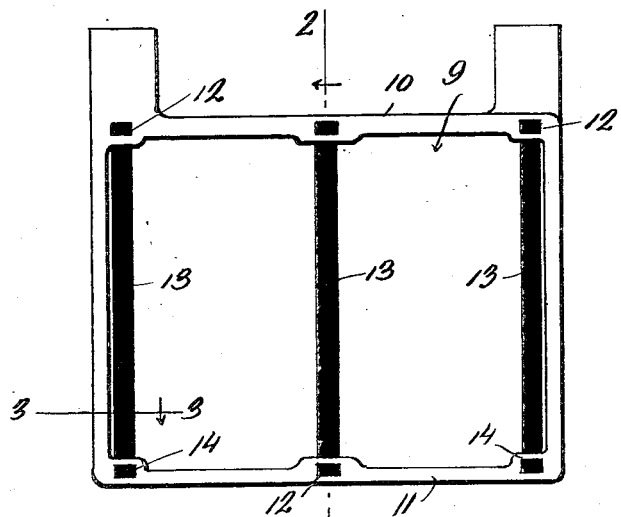
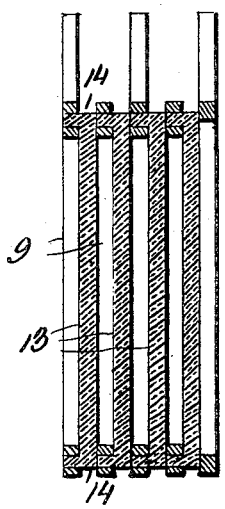
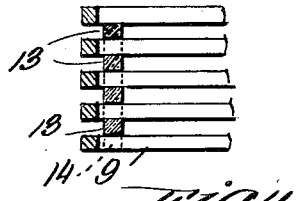
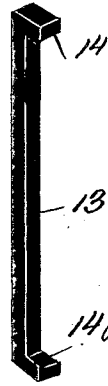

June 9, 1925. 1,541,377
R. B. OWEN
STORAGE BATTERY
Filed Dec. 22, 1919 2 Sheets-Sheet 2
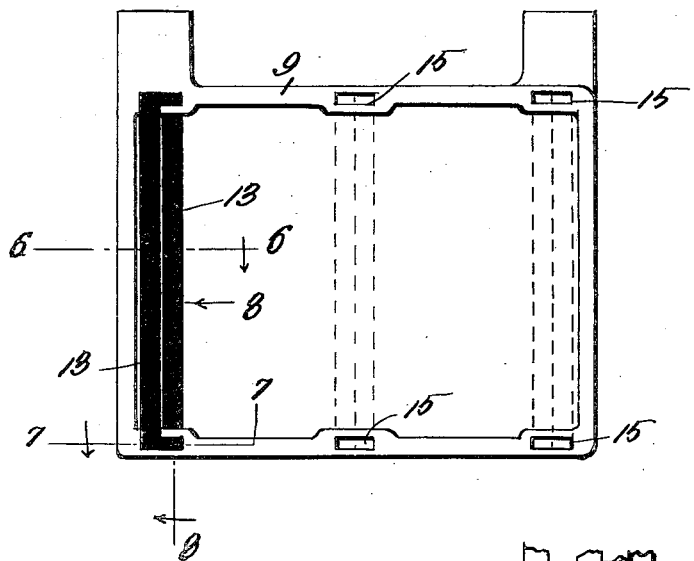
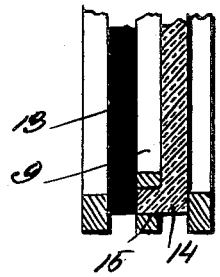
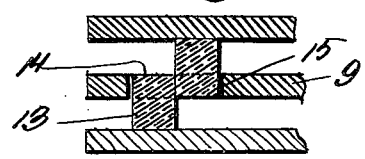

Patented June 9, 1925.

1,541,377

UNITED STATES PATENT OFFICE.

RICHARD B. OWEN, OF WASHINGTON, DISTRICT OF COLUMBIA.

STORAGE BATTERY.

Application filed December 22, 1919. Serial No. 346,555.

*To all whom it may concern:*

Be it known that I, RICHARD B. OWEN, a citizen of the United States, residing at Washington, in the District of Columbia, have invented certain new and useful Improvements in Storage Batteries, of which the following is a specification.

My invention relates to new and useful improvements in electric storage battery electrodes or grids, and separating and insulating means therefor, the primary object of the invention being to provide means for maintaining the battery plates of a group in spaced relation to one another, and to prevent them from warping or buckling so as to contact with adjacent plates to cause a short circuit.

Another important object of the invention is to provide means for retaining the separator insulating means in engagement with the battery plates.

Another object of the invention is to provide a device of the above nature, including separator insulating elements which may be easily and quickly positioned upon a storage battery electrode or grid, and which are so arranged upon the electrode or plate that particles of the active material will not lodge upon them.

I have shown in the accompanying drawings an embodiment of my invention which is at present preferred, but it is to be understood that I do not desire to limit myself to the construction, arrangement and combination of the various parts shown and that I may resort to various changes in the construction, arrangement and combination of the various parts of the invention to be hereinafter described and set forth in the appended claims.

Figure 1 is a side elevation of my improved battery plates or electrodes with the separator insulating means associated therewith, the grid structure proper being removed for the sake of clearness.

Figure 2 is a vertical transverse section taken on the line 2—2 of Fig. 1.

Figure 3 is a fragmentary horizontal transverse section taken on the line 3—3 of Fig. 1.

Figure 4 is a perspective view of one of the separator insulating elements,

Figure 5 is a side elevation of a modified form of my battery plates or electrodes with the separator insulating means associated therewith, the grid structure proper being removed.

Figure 6 is an enlarged horizontal transverse section taken on the line 6—6 of Fig. 5.

Figure 7 is a fragmentary horizontal transverse section taken on the line 7—7 of Fig. 5, and Figure 8 is an enlarged fragmentary vertical section taken on the line 8—8 of Fig. 5.

In the drawings, wherein like numerals are employed to designate like parts throughout the several views, the numeral 9 designates a battery grid or plate having its top margin 10 and bottom margin 11 each provided with a plurality of spaced apertures 12, the apertures in the bottom margin being in vertical alinement with the apertures in the upper or top margin 10 so that the edges of these apertures present directly opposed shoulders. These apertures, are rectangular in shape and extend transversely through the grid. The perforation in the lower margin 11 is arranged in vertical alignment with the perforation in the relative upper margin 10 so that the edges of these perforations constitute a pair of directly opposed shoulders whereby an insulating element or bar 13 associated with these perforations will be retained in its proper position upon the grid, and by its abutment with the opposed shoulders is prevented from accidental vertical movement relative to the grid. A plurality of these insulating bars is associated with one face of each grid which requires the bars, in order to be spaced from its adjacent plates. In the present instance, I have provided three insulating bars for each grid, but it is of course, to be understood that I may employ as many bars as may be desirable and that they may be associated with opposite faces of the grid instead of merely one face.

Each separator bar has its ends 14 extended angularly preferably at right angles whereby they may be inserted and retained in a pair of the oppositely disposed apertures 12. When the angular extensions 14 of the insulating bars are received in their respective apertures so as to dispose the bars 13 vertically, and the battery plates of a group are assembled, the outer longitudinal face of each insulating bar is engaged by the face of the adjacent battery plate. Consequently, the bars cannot become displaced from the grids or plates when the latter are assembled within a cell jar or the like. Further, it will be noted that the inner longitudinal face of each insulating bar engages the face of the grid structure, and the active material pasted thereon of the plate on which it is mounted.

In the form of invention disclosed in Figs. 5, 6, 7 and 8, the apertures in each grid are positioned similarly to the apertures 12 of the grids in the preceding form, the only difference being that they are in the form of elongated horizontal slots 15. It will be noted that these slots 15 are pierced entirely through the margins of the grid and are therefore bounded on all sides by portions of the grid. In the form of invention shown in Figure 1, it will be appreciated that it is not absolutely necessary for the angular ends 14 of the insulator bars to extend entirely through the grid, since the perforations 12 may be substituted by recesses in the faces of the grid provided they present a pair of opposed shoulders. In this modified form, however, I employ a pair of separator insulating bars 13 for each pair of oppositely disposed slots 15. One of these bars of each pair is associated with or engages one face of the battery plate, while the other of the pair engaged with the opposite face of the battery plate. The ends of each bar 13 are likewise equipped with angular extensions 14, for engagement with the slots 15, in order to retain the insulating bars in their proper position upon the plates. The angular extensions 14 of one bar of each pair are inserted in oppositely disposed apertures 15 from one side of the plate, while the angular extensions 14 of the co-acting insulating bar are inserted in the same openings from the opposite side. Consequently in this form of invention it is only necessary to equip alternate plates with the insulating bars. When a pair of insulating bars are thus retained upon the grid or plate, the angular extensions 14 engage each other within the slots 15, and also engage the edges of the slots so that there is little possibility of the insulating bars becoming detached from their respective battery plates.

As in the preceding form of invention, the outer longitudinal face of each insulating bar engages the face of an adjacent battery plate and, consequently all the plates are maintained in spaced insulated relation.

Due to the arrangement of the insulating bars 13 and the fact that opposite ends thereof are fixed to the grids, the battery plates are prevented from buckling and warping so as to come in contact with one another, and inasmuch as the insulators comprise elongated, vertically arranged bars, particles of disintegrated active material cannot possibly lodge thereon to cause a short circuit between the plates.

Having thus fully described my invention what I claim as new and desire to secure by Letters Patent, is:—

1. An electrode for storage batteries comprising a grid having a pair of spaced abutments, and a separator insulating element arranged upon the face of the grid and having the extreme outer ends of its terminals engaging said abutments to resist buckling of the grid and to prevent accidental vertical movement of said insulating element with respect to the grid.

2. An electrode for storage batteries comprising a grid having a pair of spaced perforations, and a separator insulating element having its ends extending into said perforations.

3. An electrode for storage batteries comprising a grid having perforations in the top and bottom margin thereof, and a separator insulating bar arranged on the face of the grid and having its ends provided with angular extensions for reception in said perforations.

4. An electrode for storage batteries comprising a grid having a pair of spaced perforations, and a pair of separator insulating elements arranged on opposite faces of the grid and each having portions extending into said perforations.

5. An electrode for storage batteries comprising a grid having a pair of spaced perforations, and a pair of separator insulating elements arranged on opposite faces of the grid and each element having its ends angularly disposed and extending into said perforations.

6. An electrode for storage batteries comprising a grid having a pair of oppositely disposed slots in the top and bottom margins thereof, said pair of slots being in vertical alinement, and a pair of separator insulating bars engaging opposite faces of said grid, said bars having their ends provided with angular extensions for reception in said slots, and said extensions of each bar engaging the extensions of the co-acting bar within said slots.

In testimony whereof I affix my signature.

RICHARD B. OWEN.

Witness:

M. E. JONES.